(12) United States Patent
Brand et al.

(10) Patent No.: US 8,310,070 B2
(45) Date of Patent: Nov. 13, 2012

(54) METHOD AND SYSTEM FOR GENERATING ELECTRICITY

(75) Inventors: John William Brand, Melbourne, FL (US); Daniel Joseph Rush, Palm Bay, FL (US); Mark Bradshaw Kraeling, Melbourne, FL (US); Steven Andrew Kellner, Melbourne, FL (US); Christopher Louis Rekucki, Rockledge, FL (US); Armin H. Pfoh, Starnberg (DE); Brian William Schroeck, Rockledge, FL (US)

(73) Assignee: General Electric Company, Schenectady, NY (US)

( * ) Notice: Subject to any disclaimer, the term of this patent is extended or adjusted under 35 U.S.C. 154(b) by 933 days.

(21) Appl. No.: 12/139,967

(22) Filed: Jun. 16, 2008

(65) Prior Publication Data

US 2009/0309370 A1    Dec. 17, 2009

(51) Int. Cl.
*F02B 63/04*    (2006.01)
(52) U.S. Cl. .......................................... 290/1 R; 290/1 E
(58) Field of Classification Search .................. 290/1 R, 290/1 E
See application file for complete search history.

(56) References Cited

U.S. PATENT DOCUMENTS

| | | | |
|---|---|---|---|
| 3,581,084 A | | 5/1971 | Kaneno et al. |
| 3,898,439 A | * | 8/1975 | Reed et al. ..................... 700/287 |
| 4,117,529 A | | 9/1978 | Stark et al. |
| 4,886,226 A | | 12/1989 | Frielinghaus |
| 4,980,572 A | | 12/1990 | Sen |
| 5,703,474 A | | 12/1997 | Smalser |
| 5,743,495 A | | 4/1998 | Welles, II et al. |
| 6,102,340 A | | 8/2000 | Peek et al. |
| 6,172,426 B1 | | 1/2001 | Galich |
| 6,362,534 B1 | | 3/2002 | Kaufman |
| 6,376,925 B1 | * | 4/2002 | Galich ......................... 290/1 R |
| 6,580,177 B1 | | 6/2003 | Hagood, IV et al. |
| 6,655,639 B2 | | 12/2003 | Grappone |
| 6,734,575 B2 | | 5/2004 | Ricketts |

(Continued)

FOREIGN PATENT DOCUMENTS

WO    2005/005831 A    1/2005

(Continued)

OTHER PUBLICATIONS

H.A. Sodano, et al, "Estimation of Electric Charge Output for Piezoelectric Energy Harvesting", 2004, Strain, vol. 40, pp. 49-58.

(Continued)

*Primary Examiner* — Tho D Ta
(74) *Attorney, Agent, or Firm* — GE Global Patent Operations; John A. Kramer

(57) ABSTRACT

A method for generating electricity along a roadway is provided. The method includes actuating an energy transfer assembly coupled to the roadway, wherein the energy transfer assembly is actuated by a force acting upon the roadway. The method also includes generating electricity at a generator coupled to the energy transfer assembly, the generator being driven by actuation of the energy transfer assembly.

17 Claims, 4 Drawing Sheets

U.S. PATENT DOCUMENTS

| | | | |
|---|---|---|---|
| 6,756,694 B2 | 6/2004 | Ricketts | |
| 6,779,761 B2 | 8/2004 | Holgate | |
| 6,845,953 B2 | 1/2005 | Kane et al. | |
| 6,949,840 B2 | 9/2005 | Ricketts | |
| 7,105,940 B2 * | 9/2006 | Weesner et al. | 290/44 |
| 7,145,257 B2 | 12/2006 | Ricketts | |
| 7,148,581 B2 * | 12/2006 | Hershey et al. | 290/1 R |
| 7,164,211 B1 * | 1/2007 | Tafoya et al. | 290/1 R |
| 7,239,031 B2 * | 7/2007 | Ricketts | 290/1 R |
| 7,629,698 B2 * | 12/2009 | Horianopoulos et al. | 290/1 R |
| 7,812,508 B2 | 10/2010 | Abramovich et al. | |
| 2003/0132636 A1 | 7/2003 | Ricketts | |
| 2006/0006653 A1 | 1/2006 | Ricketts | |
| 2006/0152008 A1 * | 7/2006 | Ghassemi | 290/1 R |
| 2007/0085342 A1 | 4/2007 | Horianopoulos et al. | |
| 2007/0246940 A1 | 10/2007 | Fajardo Valon | |
| 2009/0173589 A1 * | 7/2009 | Nejmeh | 191/2 |

FOREIGN PATENT DOCUMENTS

| | | |
|---|---|---|
| WO | 2006/120645 A | 11/2006 |

OTHER PUBLICATIONS

H.A. Sodano, et al, "A Review of Power Harvesting from Vibration Using Piezoelectric Materials", May 2004, The Shock and Vibration Digest, vol. 36, Issue 3, pp. 197-205.

F. Lu et al, "Modeling and Analysis of Micro Piezoelectric Power Generators for Mico-Electromechanical Systems Applications", 2004 Smart Materials and Structures, vol. 13 pp. 57-63.

Nathan. Shenck, et al, "Energy Scavenging with Shoe-Mounted Piezoelectrics", May/Jun. 2001, IEEE Micro, vol. 21, Issue 3, pp. 30-42.

Geffrey K. Ottman, et al, "Adaptive Piezoelectric Energy Harvesting Circuit Using Step-Down Converter in Discontinuous Conduction Mode", Mar. 2003, IEEE Transactions on Power Electronics, vol. 18, No. 2, pp. 696-703.

WO Search Report issued in PCT/US/2009/44434 issued Aug. 21, 2009.

WO Written Opinion issued in PCT/US/2009/44434 issued Aug. 21, 2009.

* cited by examiner

METHOD AND SYSTEM FOR GENERATING ELECTRICITY

BACKGROUND OF THE INVENTION

The field of invention relates generally to generating electricity and, more particularly, to a method and a system for generating electricity for powering wayside devices along a railroad track.

Many known railroad systems employ a variety of wayside equipment alongside the railroad tracks. Such wayside equipment may include equipment for use in determining location of the rolling stock, equipment for use in signaling to an operator and/or nearby pedestrians, equipment for use in inspecting equipment, cargo, and/or the surrounding environment, and equipment for use in switching converging tracks. Within a network, railroad tracks often span rural and unpopulated areas, and as such, providing power to wayside equipment in remote locations may be a challenging and costly task. At least some known railroad systems run power lines into remote areas to power wayside equipment. However, depending on the location, such power systems may be expensive to install and to maintain.

BRIEF DESCRIPTION OF THE INVENTION

In one aspect, a method for generating electricity along a roadway is provided. The method includes actuating an energy transfer assembly coupled to the roadway, wherein the energy transfer assembly is actuated by a force acting upon the roadway. The method also includes generating electricity at a generator coupled to the energy transfer assembly, the generator being driven by actuation of the energy transfer assembly.

In another aspect, a system for generating electricity along a roadway is provided. The system includes an energy transfer assembly coupled to the roadway such that a force acting upon the roadway causes actuation of the energy transfer assembly. The system also includes an electrical generator coupled to the energy transfer assembly such that actuation of the energy transfer assembly causes the electrical generator to generate electricity.

In another aspect, an energy transfer assembly for use in generating electricity along a roadway is provided. The energy transfer assembly includes a drive mechanism coupled to the roadway such that a force acting upon the roadway facilitates actuating the drive mechanism.

DETAILED DESCRIPTION OF THE INVENTION

The following detailed description illustrates the above-described method and system by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is generally described herein as being applied to an exemplary embodiment, namely, generating electricity for powering railroad wayside devices. However, it is contemplated that this disclosure has general application to generating electricity along any roadway and in a broad range of other industrial, commercial, and residential applications.

As used herein, an accumulator is defined as any energy storage means, such as, but not limited to, a spring loaded container, a raised weight container, a compressed gas container, a capacitor, an electrochemical cell, a compulsator, and/or a wave energy machine. A working fluid is defined as any transferable substance, such as, for example, a gas, a liquid, and/or an electric current. A fluid transfer line is defined as any cable, tube, pipe, hose, and/or the like that facilitates a flow of working fluid there through.

Figure 1:
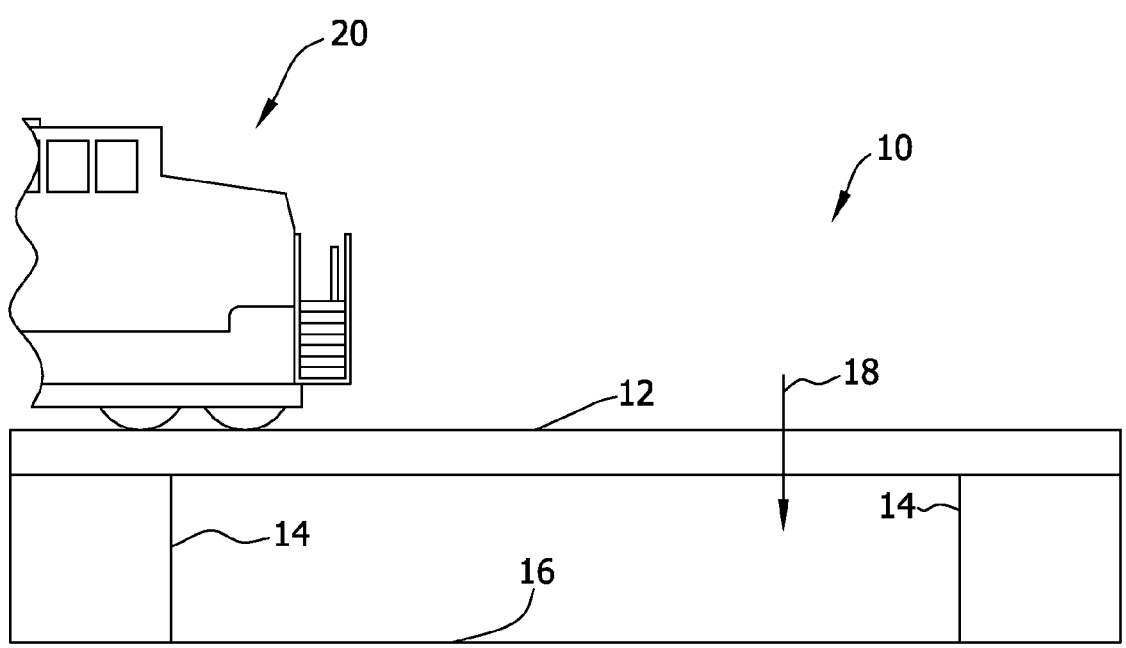
FIG. 1 is a side view of a portion of an exemplary railroad track.

FIG. 1 is a perspective view of an exemplary railroad track 10. In the exemplary embodiment, railroad track 10 includes two substantially parallel rails 12 mounted on a plurality of transverse cross-ties 14 (only one of the rails 12 is shown in FIG. 1). Rails 12 are secured to cross-ties 14 using a plurality of fasteners (not shown), such as, for example, rail spikes, lag screws, or clips. In the exemplary embodiment, rails 12 are formed from a plurality of fixed-length I-beams fabricated from steel and/or iron that are bolted or welded together. Cross-ties 14 are fabricated from wood and/or any other suitable material. A plurality of metal tie plates (not shown) are used to mount rails 12 to cross-ties 14. In an alternative embodiment, rails 12 and/or cross-ties 14 may be fabricated from any suitable material and may be positioned in any suitable orientation. Cross-ties 14 are fixed within, and/or atop of, a ballast 16, such as, for example, a bed of coarse stones and/or a slab of concrete, that provides a solid, yet flexible, foundation that facilitates increasing drainage. During operation, rolling stock 20 traverses railroad track 10 and induces a compression force 18 on railroad track 10 such that undulations (not shown) are generated in rails 12. Such undulations have been observed to be up to six inches (approximately 15 cm) in travel with great force. However, undulations traveling less than six inches or more than six inches are sufficient to perform the methods and operate the systems described herein.

Figure 2:
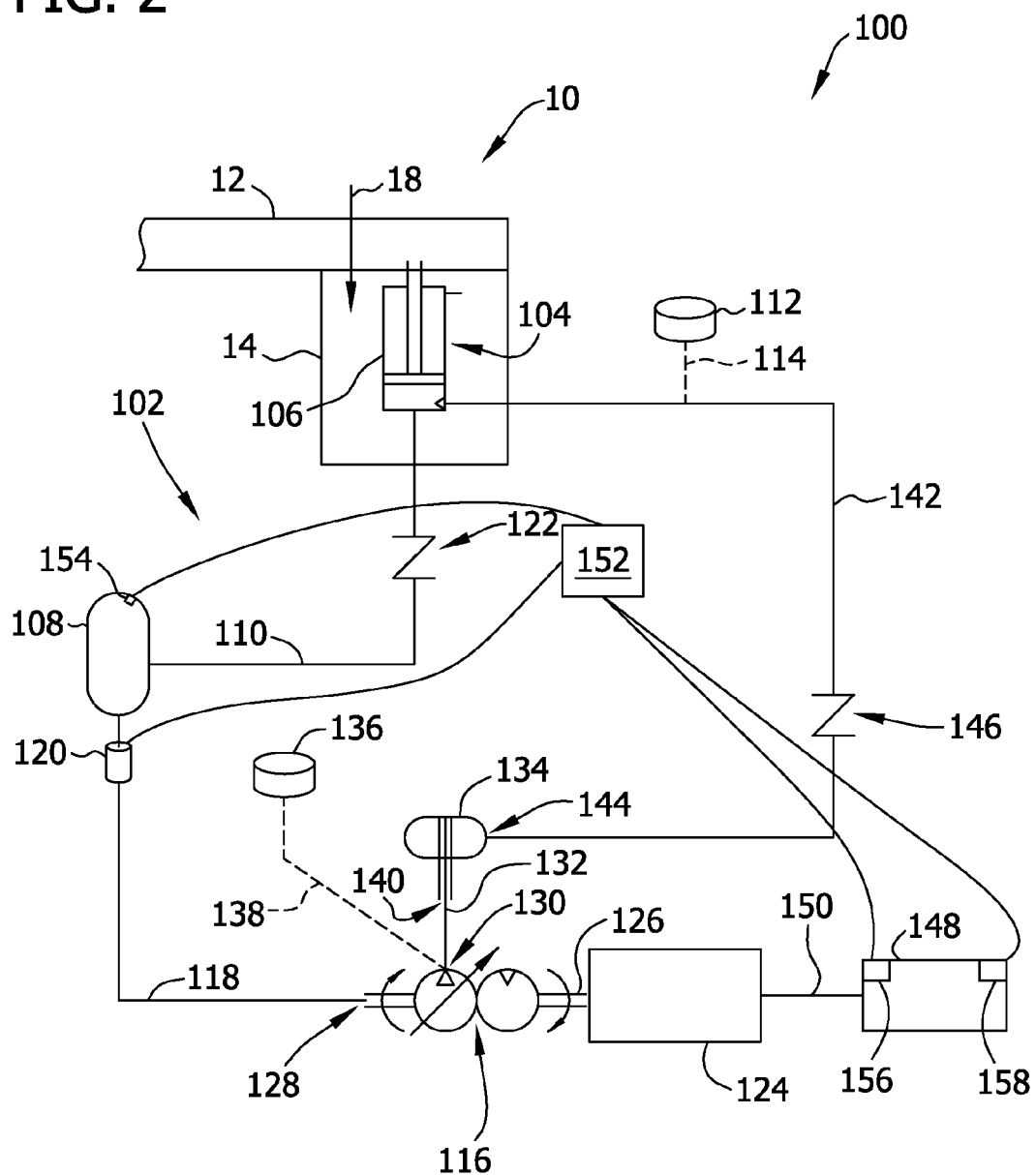
FIG. 2 is a schematic view of an exemplary system for use in generating electricity along a railroad track such as shown in FIG. 1.

FIG. 2 is a schematic illustration of an exemplary system 100 for use in generating electricity to power wayside devices (not shown) along railroad track 10. In the exemplary embodiment, system 100 is a closed-loop hydraulic system. Alternatively, system 100 may be an open-loop pneumatic system. System 100 is at least partially housed within an enclosure (not shown) located alongside railroad track 10. Such an enclosure may be fabricated to be any suitable size or shape and/or may be fabricated from any suitable material. Alternatively, the enclosure may be raised above railroad track 10, and/or system 100 may be at least partially buried beneath and/or proximate railroad track 10.

In the exemplary embodiment, system 100 includes an energy transfer assembly 102. Energy transfer assembly 102 includes a drive mechanism 104 that is coupled to railroad track 10 such that compression force 18 acting on railroad track 10 induces an action within drive mechanism 104. For example, in the exemplary embodiment, drive mechanism 104 includes a pump 106 that is at least partially encased within one cross-tie 14 such that at least a portion of pump 106 is operatively coupled to at least one rail 12. Alternatively, pump 106 may be at least partially buried in close proximity to railroad track 10 such that at least a portion of pump 106 is operatively coupled to at least one rail 12. In one embodiment, pump 106 may be at least partially housed within an object (not shown) that is proximate to railroad track 10, such as a housing (not shown) that is arranged substantially beneath at least one rail 12 and/or an artificial cross-tie (not shown) that is positioned adjacent to at least one cross-tie 14, such that at least a portion of pump 106 is operatively coupled to at least one rail 12. In another embodiment, pump 106 is completely encased within an object that is proximate to rails 12, such as at least one cross-tie 14, the enclosure, and/or the artificial cross-tie, such that compression force 18 causes actuation of pump 106 even though pump 106 is not directly coupled to a rail 12. In yet another embodiment, pump 106 may be a treadle-like pump, wherein pump 106 is at least partially housed and/or buried either remotely from, or proximate to, railroad track 10, and wherein pump 106 is coupled to railroad track 10 via a lever arm (not shown), such that compression force 18 acting on railroad track 10 causes operation of the lever arm and subsequent actuation of pump 106. In an alternative embodiment, energy transfer assembly 102 may include at least one torsional and/or biasing mechanism (e.g., a spring) for storing and/or releasing energy from compression force 18.

Pump 106 is coupled in fluid communication with an accumulator 108 across a first fluid transfer line 110. In the exemplary embodiment, system 100 is a hydraulic system, and pump 106 is a hydraulic pump, such as, for example, either a single-action or a double-action hydraulic pump. Alternatively, system 100 is a pneumatic system, and pump 106 is a pneumatic pump, such as, for example, a pneumatic piston pump or any other suitable compressor. If system 100 is a pneumatic system, pump 106 is coupled in fluid communication with a filter 112 across an intake line 114, wherein filter 112 facilitates supplying pump 106 with a working fluid (not shown) from the ambient, and/or another gas supply, across intake line 114, such that debris is substantially prevented from entering system 100.

Accumulator 108 stores the working fluid under pressurized conditions. In the exemplary embodiment, system 100 is a hydraulic system, and the working fluid is a non-compressible liquid, such as, for example, a water-based liquid or a petroleum-based liquid. In an alternative embodiment, system 100 is a pneumatic system, and the working fluid is a gas, such as ambient air. In the exemplary embodiment, accumulator 108 is a hydraulic accumulator, such as, for example, a hydro-pneumatic accumulator that utilizes a compressed inert gas, such as nitrogen, contained within at least one bladder (not shown) to pressurize the hydraulic working fluid. In an alternative embodiment, accumulator 108 is a pneumatic accumulator. System 100 may include a manifold (not shown) coupled to a plurality of accumulators (not shown) in parallel to facilitate increasing storage space for the pressurized working fluid. In the exemplary embodiment, accumulator 108 is coupled in fluid communication with a motor 116 across a second fluid transfer line 118. A supply valve 120 is coupled to accumulator 108 for selectively releasing the pressurized working fluid from within accumulator 108 towards motor 116 via second fluid transfer line 118. In one embodiment, a first check valve 122 located along first fluid transfer line 110 facilitates preventing the working fluid in first fluid transfer line 110 from flowing backward towards pump 106. First check valve 122 may be any type of check valve that enables system 100 to function as described herein, such as, for example, a ball check valve.

Energy transfer assembly 102 is coupled to a generator 124 in the exemplary embodiment. Specifically, motor 116 is coupled to generator 124 through a drive shaft 126. Motor 116 includes an inlet 128 and an outlet 130, and receives, through inlet 128, pressurized working fluid from accumulator 108 via second fluid transfer line 118. As such, the pressurized working fluid facilitates operation of motor 116, rotation of shaft 126, and driving of generator 124 to facilitate generating electricity. Motor 116 discharges the working fluid through outlet 130 and across a third fluid transfer line 132. In the exemplary embodiment, system 100 is a hydraulic system, and motor 116 is a hydraulic motor, such as, for example, a rotary hydraulic motor. In the exemplary embodiment, energy transfer assembly 102 also includes a reservoir 134 that is coupled to motor 116 via third fluid transfer line 132 such that hydraulic working fluid discharged from outlet 130 enters reservoir 134. Alternatively, system 100 is a pneumatic system, and motor 116 is a pneumatic motor, such as a rotary actuator, and motor 116 is coupled to an exhaust muffler 136 across a sixth fluid transfer line 138, such that pneumatic working fluid discharged from outlet 130 across fluid transfer line 138 is channeled through exhaust muffler 136 and into the ambient.

In the exemplary embodiment, reservoir 134 has a storage capacity and/or a pressure that is based at least partially on a storage capacity and/or a pressure of accumulator 108. Specifically, reservoir 134 stores the hydraulic working fluid under a lower pressure than the operating pressure within accumulator 108. Moreover, reservoir 134 has a storage capacity that is larger than, or approximately equal to, a storage capacity of accumulator 108. In the exemplary embodiment, reservoir 134 is coupled in fluid communication with motor 116 across third fluid transfer line 132, and reservoir 134 is coupled in fluid communication with pump 106 across a fourth fluid transfer line 142. Reservoir 134 receives hydraulic working fluid from motor 116 via third fluid transfer line 132. Reservoir 134 also releases the working fluid towards pump 106 via fourth fluid transfer line 142.

In one embodiment, a second check valve 146 is coupled along fourth fluid transfer line 142 to substantially prevent hydraulic working fluid from flowing backward towards reservoir 134. Second check valve 146 may be any type of check valve that allows system 100 to function as described herein, such as, for example, a ball check valve.

In operation, if system 100 is a hydraulic system, as rolling stock 20 traverses railroad track 10, pump 106 is actuated, thereby forcing hydraulic working fluid through first fluid transfer line 110 towards accumulator 108 at a higher operating pressure, as compared to an operating pressure within fourth fluid transfer line 142. The higher operating pressure in first fluid transfer line 110 facilitates drawing hydraulic working fluid from reservoir 134 into fourth fluid transfer line 142, and towards pump 106. If system 100 is a pneumatic system, as rolling stock 20 traverses railroad track 10, pump 106 is actuated, thereby inducing a flow of pneumatic fluid (e.g., air) through filter 112, through intake line 114, and towards pump 106.

Generator 124 is coupled to an energy storage device 148 that includes, for example, an electrochemical device (e.g., a battery), such as an electrolytic capacitor and/or an ultracapacitor, across a plurality of wires 150. Alternatively, energy storage device 148 may include a plurality of energy storage devices 148. In another embodiment, generator 124 may be coupled directly to a load (not shown), such as, for example, an electric circuit (not shown) configured to operate a wayside device (not shown).

A controller 152 is communicatively coupled to supply valve 120 and to a pressure sensor 154 that is positioned at least partially within accumulator 108. Pressure sensor 154 monitors a pressure within accumulator 108. In one embodiment, system 100 is a hydraulic system, accumulator 108 is a hydro-pneumatic accumulator, and pressure sensor 154 monitors a pressure of the inert gas within the bladder, generates a signal (not shown) indicative of the monitored pressure, and transmits the signal to controller 152. In an alternative embodiment, pressure sensor 154 is a binary pressure switch. Controller 152 is also coupled to a current sensor 156 and a voltage sensor 158. Current sensor 156 and voltage sensor 158 are coupled to energy storage device 148 to monitor a current and a voltage, respectively, of energy storage device 148. A signal (not shown) is generated by either current sensor 156 and/or voltage sensor 158 that is indicative of the monitored current and/or voltage, respectively. The signal is transmitted to controller 152, as described in more detail below. Alternatively, controller 152 may be coupled to any of accumulator 108, energy storage device 148, pump 106, motor 116, generator 124, first check valve 122, or second check valve 146 using any number of sensors.

As used herein, the term controller may include any processor-based or microprocessor-based system, such as a computer system, that includes microcontrollers, reduced instruction set circuits (RISC), application-specific integrated circuits (ASICs), logic circuits, and any other circuit or processor that is capable of executing the functions described herein. The examples given above are exemplary only, and are not intended to limit in any way the definition and/or meaning of the term controller.

As used herein, with reference to a real-time controller, the term real-time refers to outcomes occurring a substantially short period after a change in the inputs affect the outcome. The time period is an amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome.

In the exemplary embodiment, controller 152 is programmed to monitor at least one component within system 100. Specifically, in the exemplary embodiment, controller 152 is programmed to iteratively request a pressure measurement of accumulator 108 from pressure sensor 154, a current measurement of energy storage device 148 from current sensor 156, and/or a voltage measurement of energy storage device 148 from voltage sensor 158. In an alternative embodiment, controller 152 is programmed to receive iterative status reports from each of pressure sensor 154, current sensor 156, and/or voltage sensor 158 at predetermined time intervals. In one embodiment, the iterative requests from controller 152 to pressure sensor 154, and/or the iterative status reports from pressure sensor 154 to controller 152, are sent every one hundred milliseconds, and the iterative requests from controller 152 to current sensor 156 and/or voltage sensor 158, and/or the iterative status reports from current sensor 156 and/or voltage sensor 158 to controller 152, are transmitted approximately once every second. In another embodiment, the iterative requests and/or iterative status reports may be transmitted at any suitable time interval. Alternatively, or in addition, one or more of sensors 154, 156, and/or 158 may generate a constant signal output that controller 152 at least periodically monitors.

Furthermore, in the exemplary embodiment, controller 152 is programmed to compare each of the pressure, the current, and/or the voltage measurements to pre-determined maximum (or minimum) pressure, maximum (or minimum) current, and/or maximum (or minimum) voltage values, respectively, stored within controller 152. If one of the pressure measurements is higher than the maximum pressure value, one of the current measurements is higher than the maximum current value, and/or one of the voltage measurements is lower than the minimum voltage value, controller 152 opens supply valve 120 to facilitate charging energy storage device 148. Conversely, if one of the pressure measurements is lower than the minimum pressure value, one of the current measurements is lower than the minimum current value, and/or one of the voltage measurements is higher than the maximum voltage value, controller 152 closes supply valve 120 to facilitate pressurizing accumulator 108.

The various embodiments of controller 152, or the components thereof, may be implemented as a part of a computer system. The computer system may be housed within the enclosure and/or located remotely from railroad track 10, such as, for example, at a centralized traffic control center (CTC). The computer system may include a computer, an input device, a display unit, and an interface, for example, to access the Internet. The computer system may also include a processor, which may be connected to a communication bus. The computer may include a memory, which may include a Random Access Memory (RAM) and a Read Only Memory (ROM), as well as a storage device, which may be a hard disk drive or a removable storage drive such as a floppy disk drive, an optical disk drive, and so forth. The storage device is configured to load computer programs and/or other instructions into the computer system. As used herein, the term "processor" is not limited to only integrated circuits referred to in the art as a processor, but broadly refers to a computer, a microcontroller, a microcomputer, microprocessor, a programmable logic controller, an application specific integrated circuit and any other programmable circuit.

The computer system executes instructions, stored in one or more storage elements, to process input data. The storage elements may also hold data or other information, as desired or required, and may be in the form of an information source or a physical memory element in the processing machine. The set of instructions may include various commands that instruct the computer system to perform specific operations, such as the processes of a method. The set of instructions may be in the form of a software program. The software may be in various forms, such as system software or application software. Further, the software may be in the form of a collection of separate programs, a program module within a larger program, or a portion of a program module. The software may also include modular programming in the form of object-oriented programming. The processing of input data by the processing machine may be in response to user commands, to results of previous processing, or to a request made by another processing machine.

As used herein, the term 'software' includes any computer program that is stored in the memory, to be executed by a computer, which includes RAM memory, ROM memory, EPROM memory, EEPROM memory, and non-volatile RAM (NVRAM) memory. The memory types mentioned above are only exemplary and do not limit the types of memory used to store computer programs.

As will be appreciated by one skilled in the art and based on the foregoing specification, the above-described embodiments of the invention may be implemented using computer programming or engineering techniques including computer software, firmware, hardware or any combination or subset thereof that is configured to control various components of a system for generating electricity. Any resulting program, having computer-readable code means, may be embodied or provided within one or more computer-readable media, thereby making a computer program product, i.e., an article of manufacture, according to the discussed embodiments of the invention. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Figure 3:
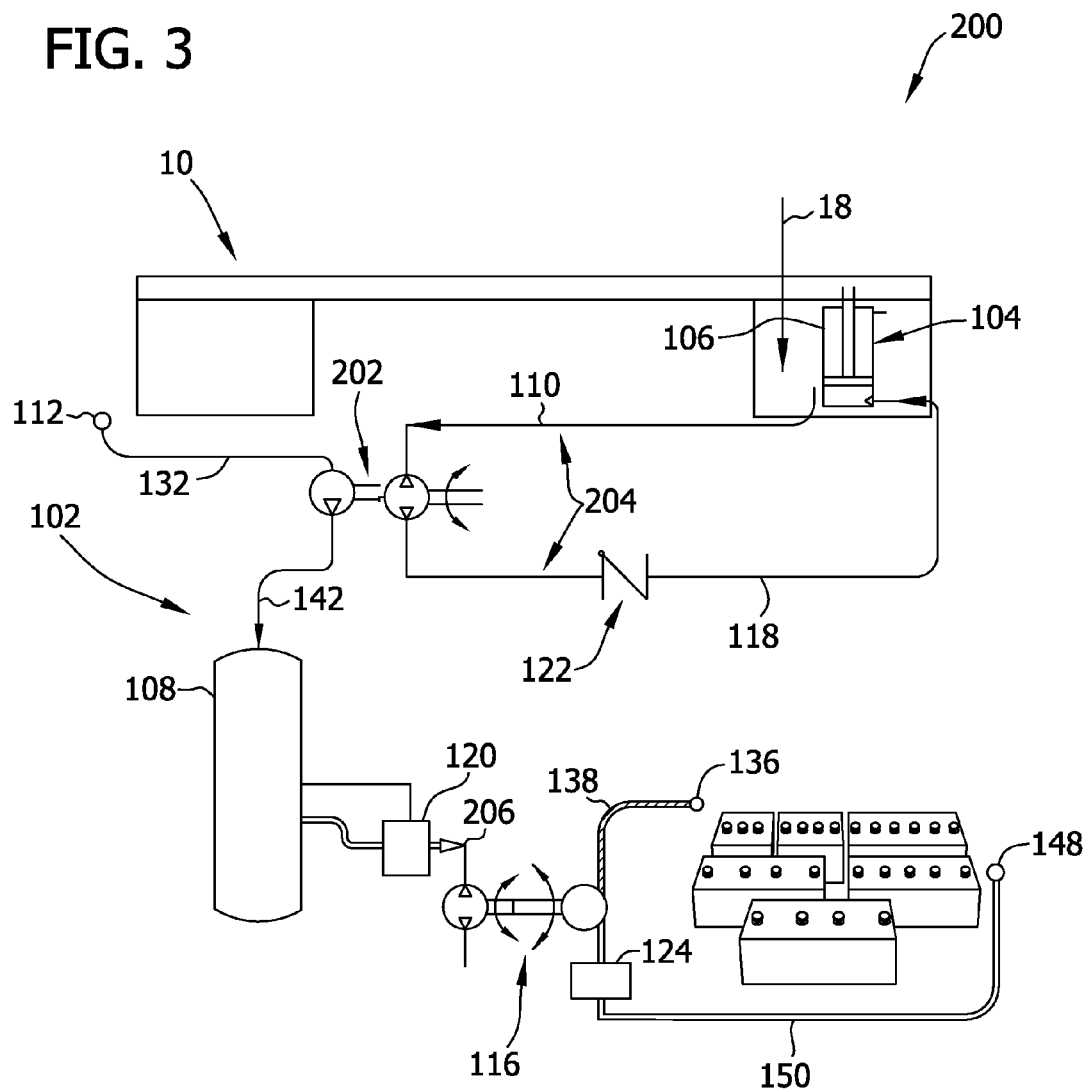
FIG. 3 is a schematic view of an alternative system for use in generating electricity along a railroad track such as shown in FIG. 1.

FIG. 3 is an exemplary system 200 for use in generating electricity for powering a device (not shown) along the wayside of railroad track 10. System 200 is a hydro-pneumatic system that is similar to system 100 (shown in FIG. 2), and similar components are identified in FIG. 3 using the same numerals used in FIG. 2. System 200 includes energy transfer assembly 102 and drive mechanism 104. In the exemplary embodiment, drive mechanism 104 includes pump 106. Specifically, pump 106 is a hydraulic pump coupled to railroad track 10, as described above. Energy transfer assembly 102 also includes a hydro-pneumatic motor 202 coupled in fluid communication with pump 106 across fluid transfer lines 110 and 118. Hydraulic working fluid (not shown) is housed within either first fluid transfer line 110 and/or second fluid transfer line 118. First check valve 122 is positioned along second fluid transfer line 118. First fluid transfer line 110 and second fluid transfer line 118 form a closed-loop hydraulic transfer line 204. Additionally, energy transfer assembly 102 includes filter 112 coupled in fluid communication with hydro-pneumatic motor 202 across third fluid transfer line 132. Motor 202 is coupled in fluid communication with accumulator 108 across fourth fluid transfer line 142. In the exemplary embodiment, accumulator 108 is a pneumatic accumulator coupled in fluid communication with motor 116 across a fifth fluid transfer line 206. Motor 116 is rotatably coupled to generator 124, and generator 124 is electrically coupled to energy storage device 148 via a plurality of wires 150. Motor 116 is a pneumatic motor in the exemplary embodiment and is coupled to exhaust muffler 136 via sixth fluid transfer line 138.

During operation, as rolling stock 20 traverses railroad track 10, pump 106 is actuated causing hydraulic working fluid to flow through first fluid transfer line 110, through hydro-pneumatic motor 202, and through second fluid transfer line 118. Hydro-pneumatic motor 202 is actuated causing hydraulic working fluid to flow through the closed-loop hydraulic fluid transfer line 204. When actuated, hydro-pneumatic motor 202 facilitates drawing pneumatic working fluid, such as ambient air, through filter 112, and into third fluid transfer line 132. The pneumatic working fluid flows through motor 202 and across fourth fluid transfer line 142 for storage in accumulator 108 under pressurized conditions. Supply valve 120 selectively releases pressurized pneumatic working fluid from within accumulator 108, across fifth fluid transfer line 206, and towards motor 116. Motor 116 is actuated by the pressurized pneumatic working fluid flowing across fluid transfer line 206. Motor 116 discharges pressurized pneumatic working fluid across fluid transfer line 138 and into the ambient through exhaust muffler 136. Upon actuation of motor 116, generator 124 rotates and generates electricity such that electrical energy may be stored in energy storage device 148.

Figure 4:
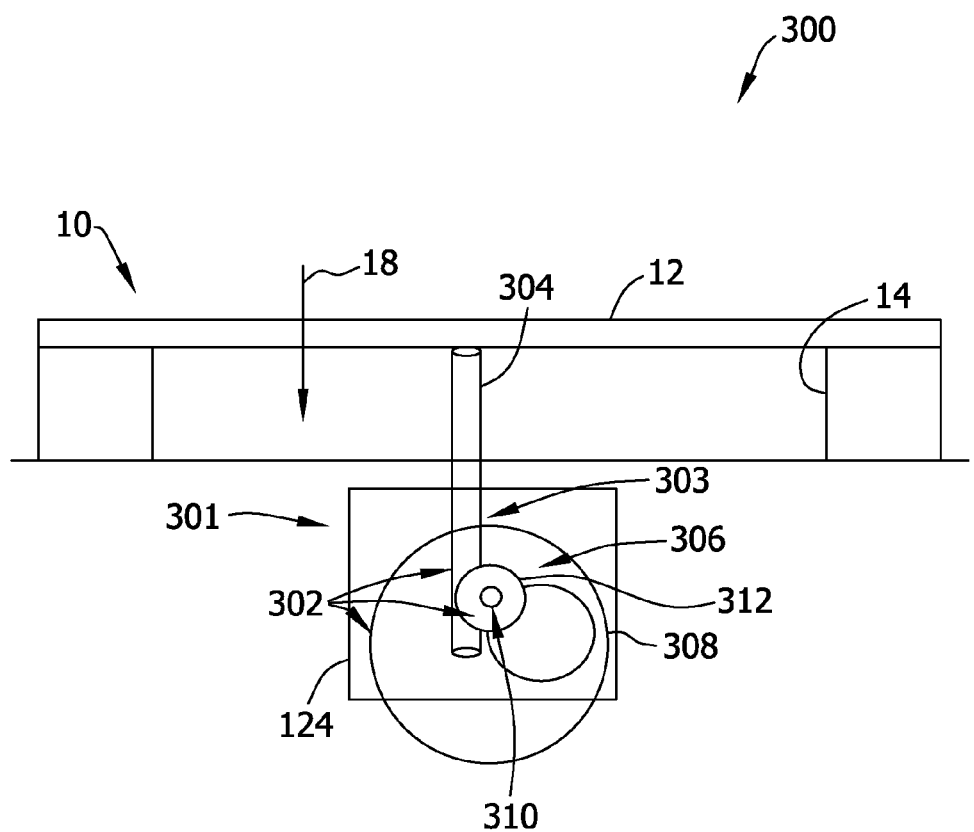
FIG. 4 is a schematic view of yet another alternative system for use in generating electricity along a railroad track such as shown in FIG. 1.

FIG. 4 is an exemplary system 300 for generating electricity for use in powering a device (not shown) along the wayside of railroad track 10. System 300 is similar to system 100 (shown in FIG. 2), and similar components are identified in FIG. 4 using the same reference numerals used in FIG. 2. System 300 includes a railroad track 10 (shown in FIG. 1), an energy transfer assembly 301, and a generator 124 (shown in FIG. 2). Energy transfer assembly 301 includes a drive mechanism 303. In the exemplary embodiment, drive mechanism 303 is a geared flywheel assembly 302. Geared flywheel assembly 302 includes a piston 304, a plurality of gears 306, and a flywheel 308. Generator 124 is coupled to flywheel 308 using a shaft (not shown), and energy storage device 148 (shown in FIG. 2) is coupled to generator 124 using a plurality of wires 150 (shown in FIG. 2).

Piston 304 is coupled to railroad track 10 such that compression force 18 acting on railroad track 10 causes a displacement of piston 304. Specifically, in the exemplary embodiment, geared flywheel assembly 302 is a least partially encased within one cross-tie 14 such that piston 304 is operatively coupled to at least one rail 12. Alternatively, geared flywheel assembly 302 may be at least partially buried underground proximate to railroad track 10 such that piston 304 is operatively coupled to at least one rail 12. In one embodiment, geared flywheel assembly 302 may be at least partially housed within an object that is proximate to railroad track 10, such as an enclosure (not shown) positioned substantially beneath at least one rail 12 and/or an artificial cross-tie (not shown) that is positioned adjacent to at least one cross-tie 14, such that piston 304 is operatively coupled to at least one rail 12. In another embodiment, geared flywheel assembly 302 is completely encased within an object that is proximate to rails 12, such as an enclosure, such that piston 304 is not directly coupled to rails 12 and such that compression force 18 displaces piston 304.

Additionally, piston 304 is coupled to at least one gear 306 such that a displacement of piston 304 causes rotation of at least one gear 306 and flywheel 308. In one embodiment, gears 306 may include a gear rack (not shown), a pinion 310, and a centrifugal clutch 312. At least one gear 306 is coupled to generator 124, such that a rotation of at least one gear 306 causes flywheel 308 and generator 124 to rotate, thereby generating electricity. Generator 124 is coupled to energy storage device 148 (shown in FIG. 2), such that a rotation of generator 124 generates electricity such that electrical energy may be stored in energy storage device 148.

In operation, rolling stock 20 traverses railroad track 10, thereby inducing a compression force 18 on railroad track 10 such that undulations are generated in rails 12. The undulations in rails 12 and/or compression force 18 acting on railroad track 10 causes a displacement of piston 304 relative to rails 12 and/or cross-ties 14. As a result, at least one gear 306 is rotated, causing flywheel 308 and generator 124 to rotate, such that electrical energy may be stored within energy storage device 148.

The method and systems described herein facilitate powering wayside devices along a roadway. Specifically, the method and systems described herein facilitate utilizing a force acting upon the roadway to facilitate generating electricity for powering the wayside devices. As such, the method and systems described herein facilitate reducing a need to run electrical cables to power the wayside devices, thereby facilitating powering the wayside devices in an efficient and cost-effective manner.

Exemplary embodiments of a method and systems for generating electricity are described above in detail. The method and systems for generating electricity are not limited to the specific embodiments described herein, but rather, components of the method and systems may be utilized independently and separately from other components described herein. For example, the method and systems described herein may have other industrial and/or consumer applications and are not limited to practice with only railroad systems as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method for generating electricity along a roadway, said method comprising:
    actuating an energy transfer assembly coupled to the roadway, wherein the energy transfer assembly is actuated by a force acting upon the roadway; and
    generating electricity at a generator coupled to the energy transfer assembly, the generator being driven by actuation of the energy transfer assembly,
    wherein actuating the energy transfer assembly coupled to the roadway comprises:
        actuating a pneumatic pump coupled to the roadway;
        charging an accumulator using the pump, wherein the accumulator is coupled in fluid communication with the pump;
        actuating a motor using the accumulator, wherein the motor is coupled in fluid communication with the accumulator, and wherein the motor drives the generator;
        filtering a fluid using a filter coupled in fluid communication with the pump; and
        discharging the fluid using an exhaust muffler coupled in fluid communication with the motor.

2. A method in accordance with claim 1, wherein actuating an energy transfer assembly coupled to the roadway comprises actuating a flywheel coupled to the roadway.

3. A method in accordance with claim 1, further comprising charging an energy storage device electrically coupled to the generator.

4. A method in accordance with claim 1, further comprising:
    charging an energy storage device electrically coupled to the generator; and
    monitoring a pressure in the accumulator and at least one of a voltage and a current in the energy storage device using a controller coupled to the accumulator and the energy storage device.

5. A system for generating electricity along a roadway, said system comprising:
    an energy transfer assembly coupled to the roadway such that a force acting upon the roadway causes actuation of said energy transfer assembly; and
    an electrical generator coupled to said energy transfer assembly such that actuation of said energy transfer assembly causes said electrical generator to generate electricity,
    wherein said energy transfer assembly comprises:
        a pneumatic pump;
        an accumulator coupled in fluid communication with said pump;
        a motor coupled in fluid communication with said accumulator,
        wherein said motor is rotatably coupled to said generator;
        a filter coupled in fluid communication with said pump; and
        an exhaust muffler coupled in fluid communication with said motor.

6. A system in accordance with claim 5, wherein said energy transfer assembly comprises a flywheel.

7. A system in accordance with claim 5, further comprising an energy storage device that is electrically coupled to said generator.

8. A system in accordance with claim 5, further comprising:
    an energy storage device coupled to said generator; and
    a controller coupled to said accumulator and to said energy storage device, said controller configured to monitor a pressure in said accumulator and at least one of a voltage and a current in said energy storage device.

9. An energy transfer assembly for use in generating electricity along a roadway, said energy transfer assembly comprising: a drive mechanism coupled below a surface of the roadway such that a force acting upon the roadway facilitates actuating said drive mechanism below a surface of the roadway;
    wherein the roadway is a railroad track including a cross-tie and a rail, said drive mechanism being at least partially encased within the cross-tie and coupled to the rail.

10. An energy transfer assembly in accordance with claim 9, wherein said drive mechanism comprises a pump.

11. An energy transfer assembly in accordance with claim 9, wherein said drive mechanism comprises a flywheel.

12. The energy transfer assembly of claim 9, comprising:
    an accumulator coupled to the drive mechanism configured to store energy generated by actuation of the drive mechanism;
    a generator communicative coupled to the accumulator and configured to generate electricity;
    a energy storage device electrically coupled to the generator and configured to store the generated electricity; and
    a controller configured to monitor the energy stored in the accumulator and the electricity stored in the energy storage device and enable the accumulator to deliver the stored energy to the generator to generate electricity when the energy stored in the accumulator exceeds a first pre-determined value and/or the stored energy is less than a second pre-determined value.

13. The energy transfer assembly of claim 12, comprising a motor coupled to the accumulator and the generator, and wherein the controller is configured to enable the accumulator to deliver the stored energy to motor when the energy stored in the accumulator exceeds the first pre-determined value and/or the stored energy is less than the second pre-determined value.

14. A system for generating electricity along a railroad track, said system comprising:
    an energy transfer assembly coupled to the railroad track such that a force acting upon the railroad track causes actuation of the energy transfer assembly;
    an electrical generator coupled to the energy transfer assembly such that actuation of the energy transfer assembly causes the electrical generator to generate electricity;
    an energy storage device coupled to the generator; and
    a controller coupled to at least one of the generator or the energy storage device, wherein the controller is configured to monitor a current and/or a voltage of the energy storage device and to control charging of the energy storage device by the generator based on the current and/or voltage that is monitored.

15. The system of claim 14 wherein:
    the energy transfer assembly comprises a pump operably coupled with the railroad track, an accumulator coupled in fluid communication with the pump for receiving fluid pressurized by the railroad track acting on the pump, and a motor coupled in fluid communication with the accumulator and rotatably coupled to said generator, the motor configured to receive pressurized fluid from the accumulator and operate the generator for generating electricity; and wherein the controller is further configured to monitor a pressure of the accumulator and to control pressurizing of the accumulator based on the pressure that is monitored.

16. The system of claim 15 wherein the controller is configured to control pressurizing of the accumulator and charging of the energy storage device both based on the current and/or voltage that is monitored and the pressure that is monitored.

17. The system of claim 15 wherein the controller is configured to control charging of the energy storage device and pressurizing of the accumulator based on comparing the voltage and/or current to one or more pre-determined voltage and/or current maximum or minimum values and the pressure to one or more pre-determined pressure maximum or minimum values.

* * * * *